United States Patent
Yurt et al.

(10) Patent No.: US 11,708,513 B2
(45) Date of Patent: Jul. 25, 2023

(54) PRESSURE SENSITIVE ADHESIVE COMPRISING (METH)ACRYLIC POLYMER AND AMINO ACID CROSSLINKER

(71) Applicant: 3M INNOVATIVE PROPERTIES COMPANY, St. Paul, MN (US)

(72) Inventors: Serkan Yurt, St. Paul, MN (US); Ibrahim A. El-Hedok, Woodbury, MN (US); Kumars Sakizadeh, Woodbury, MN (US); Jayshree Seth, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 512 days.

(21) Appl. No.: 17/015,366

(22) Filed: Sep. 9, 2020

(65) Prior Publication Data

US 2020/0407607 A1 Dec. 31, 2020

Related U.S. Application Data

(63) Continuation of application No. 15/737,500, filed as application No. PCT/US2016/038695 on Jun. 22, 2016, now Pat. No. 10,808,149.

(60) Provisional application No. 62/182,827, filed on Jun. 22, 2015.

(51) Int. Cl.

| C08F 2/38 | (2006.01) |
|---|---|
| C09J 133/08 | (2006.01) |
| C08K 5/00 | (2006.01) |
| C08K 5/17 | (2006.01) |
| C09J 133/10 | (2006.01) |
| C09J 133/14 | (2006.01) |
| C09J 4/00 | (2006.01) |

(52) U.S. Cl.
CPC .............. *C09J 133/08* (2013.01); *C08F 2/38* (2013.01); *C08K 5/0025* (2013.01); *C08K 5/175* (2013.01); *C09J 133/10* (2013.01); *C09J 133/14* (2013.01); *C08F 2810/20* (2013.01); *C08L 2201/52* (2013.01); *C09J 4/00* (2013.01); *C09J 2433/005* (2013.01)

(58) Field of Classification Search
CPC .......... C09J 133/08; C09J 133/14; C08F 2/38; C08K 5/175
See application file for complete search history.

(56) References Cited

U.S. PATENT DOCUMENTS

| 3,691,140 | A | 9/1972 | Silver |
|---|---|---|---|
| 4,150,945 | A | 4/1979 | Onizawa |
| 4,166,152 | A | 8/1979 | Baker |
| 4,172,934 | A | 10/1979 | Heilmann |
| 4,636,432 | A | 1/1987 | Shibano |
| 4,656,218 | A | 4/1987 | Kinoshita |
| 4,663,409 | A | 5/1987 | Friends |
| 5,045,569 | A | 9/1991 | Delgado |
| 5,270,351 | A | 12/1993 | Bowen |
| 6,166,102 | A | 12/2000 | Ahn |
| 6,395,836 | B1 | 5/2002 | Shinoda |
| 8,568,564 | B2 | 10/2013 | Cordova |
| 10,011,671 | B2 | 7/2018 | Takahara |
| 2006/0051587 | A1 | 3/2006 | Mori |
| 2009/0246390 | A1 | 10/2009 | Krepski |
| 2011/0033532 | A1 | 2/2011 | Angel |
| 2011/0040050 | A1 | 2/2011 | Prenze |
| 2011/0152445 | A1 | 6/2011 | Krepski |
| 2012/0111620 | A1 | 5/2012 | Shibasaki |
| 2012/0250268 | A1 | 10/2012 | Ito |
| 2012/0264903 | A1 | 10/2012 | Dollase |
| 2012/0288692 | A1 | 11/2012 | Broyles |
| 2013/0225745 | A1 | 8/2013 | Fujimoto |
| 2014/0235744 | A1 | 8/2014 | Brandau |
| 2015/0051310 | A1 | 2/2015 | Stansbury |
| 2019/0316012 | A1 | 10/2019 | Yurt |

FOREIGN PATENT DOCUMENTS

| JP | H02-200476 | 8/1990 |
|---|---|---|
| JP | H09-165523 | 6/1997 |
| JP | 2001-224621 | 8/2001 |
| JP | 2003-327854 | 11/2003 |
| JP | 2004-123850 | 4/2004 |
| JP | 2006-083302 | 3/2006 |
| JP | 2006-282952 | 10/2006 |
| JP | 4274752 | 6/2009 |
| WO | WO 2000-033792 | 6/2000 |
| WO | WO 2010-000299 | 1/2010 |
| WO | WO 2014-127341 | 8/2014 |

OTHER PUBLICATIONS

International Search Report for PCT International Application No. PCT/US2016/038695, dated Aug. 31, 2016, 5 pages.
3M Fastbond™ Insulation Adhesive 49, Technical Data, Sep. 2010, 6 pages.
Wrzyszczynski, "Polymerization of Acrylamide in Aqueous Medium Initiated by a Redox System of 4-Carboxybenzophenone and Sulfur-Containing Amino Acids," Polymer, 1999, vol. 40, No. 11, pp. 3247-3249.
Zhao, "Controlled Free Radical Polymerization Mediated by Cysteine and Glutathione-Based Chain Transfer Agents," Polymeric Materials Science and Engineering, 2007, vol. 96, pp. 820-821.
Zhao, "Synthesis of Well-Defined Conjugated Copolymers by RAFT Polymerization Using Cysteine and Glutathione-Based Chain Transfer Agents", Chemical Communications, Aug. 2007, No. 41, pp. 4294-4296.

*Primary Examiner* — Michael M Dollinger
(74) *Attorney, Agent, or Firm* — Carolyn A. Fischer

(57) ABSTRACT

A pressure sensitive adhesive composition is described that comprises a (meth)acrylic polymer comprising polymerized units of (meth)acrylic ester monomer having a Tg less than 0° C. and ethylenically unsaturated monomer comprising a pendent functional group crosslinked with an amine or carboxylic acid group of at least one amino acid. Also described are aqueous pressure sensitive adhesive compositions, adhesive-coated articles, and methods.

20 Claims, No Drawings

PRESSURE SENSITIVE ADHESIVE COMPRISING (METH)ACRYLIC POLYMER AND AMINO ACID CROSSLINKER

CROSS REFERENCE TO RELATED APPLICATIONS

This application is a continuation of U.S. application Ser. No. 15/737,500, filed Dec. 18, 2017, which is a national stage filing under 35 U.S.C. 371 of PCT/US2016/038695, filed Jun. 22, 2016, which claims the benefit of U.S. Provisional Application No. 62/182,827, filed Jun. 22, 2015, the disclosure of which is incorporated by reference in its/their entirety herein.

SUMMARY

In one embodiment, a pressure sensitive adhesive composition is described. The adhesive composition comprises a (meth)acrylic polymer comprising polymerized units of (meth)acrylic ester monomer having a Tg less than 0° C. and ethylenically unsaturated monomer comprising a pendent functional group crosslinked with an amine or carboxylic acid group of at least one amino acid. In some embodiments, the pressure sensitive adhesive exhibits a 180° peel adhesion to stainless steel of at least 0.25, 0.5, 1 or 1.5 N/cm. Also described is an article comprising the pressure sensitive adhesive disposed on a substrate such as a release liner or backing.

In another embodiment, a pressure sensitive adhesive composition is described comprising an aqueous phase, a surfactant, a (meth)acrylic polymer comprising polymerized units of (meth)acrylic ester monomer having a Tg less than 0° C. and ethylenically unsaturated monomer comprising a pendent functional group wherein the pendent functional group forms an ionic or covalent bond with an amine or carboxylic acid group, and at least one amino acid crosslinker.

In other embodiments, methods of making a pressure sensitive adhesive composition are described. In some embodiments, an amino acid is combined with an aqueous pressure sensitive adhesive composition after the (meth)acrylic polymer has been formed.

DETAILED DESCRIPTION

Herein, "(meth)acrylic" includes both methacrylic and acrylic.

Herein, "(meth)acrylate" includes both methacrylate and acrylate.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

When a group is present more than once in a formula described herein, each group is "independently" selected unless specified otherwise.

The pressure sensitive adhesive composition described herein comprises a (meth)acrylic polymer. The (meth)acrylic polymer is prepared from various monomers common to acrylic adhesives, such as a (meth)acrylic acid ester monomers (i.e. a (meth)acrylate ester monomer, also referred to as alkyl (meth)acrylate. The (meth)acrylic copolymer comprises polymerized units of an ethylenically unsaturated monomer comprising a pendent functional group that forms an ionic or covalent bond with an amine or carboxylic acid group of the amino acid crosslinker. Thus, such (meth)acrylic polymer can be characterized as a (meth)acrylic copolymer. The (meth)acrylic copolymer optionally includes various other monomers.

The (meth)acrylic copolymer comprises one or more (meth)acrylate ester monomers derived from an (e.g. non-tertiary) alcohol containing from 1 to 22 carbon atoms. Examples of monomers include esters of either acrylic acid or methacrylic acid with a non-tertiary alcohol such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl alcohol, 2-ethyl-1-hexanol, 1-decanol, 2-propylheptanol, 1-dodecanol, 1-tridecanol, 1-tetradecanol, citronellol, dihydrocitronellol and the like.

The pressure sensitive adhesive comprises one or more (meth)acrylic acid ester monomers having a low glass transition temperature (Tg) less than 0° C. when reacted to form a homopolymer. Suitable low Tg monomers typically have a Tg less than −10° C., −20° C., −30° C., or −40° C. when such is monomer reacted to form a homopolymer. The Tg of these homopolymers is often greater than or equal to −80° C., greater than or equal to −70° C., or greater than or equal to −60° C., or greater than or equal to −50° C.

The low Tg alkyl acrylate monomer may have the following formula

$$H_2C=CR^1C(O)OR^2$$

wherein $R^1$ is hydrogen or methyl and $R^2$ is alkyl or heteroalkyl with 1 to 22 carbons. The alkyl or heteroalkyl group can be linear, branched, cyclic, or a combination thereof.

Exemplary low Tg alkyl acrylates include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 4-methyl-2-pentyl acrylate, n-octyl acrylate, isooctyl acrylate, 2-ethylhexyl acrylate, isononyl acrylate, decyl acrylate, isodecyl acrylate, lauryl acrylate, isotridecyl acrylate, octadecyl acrylate, and dodecyl acrylate.

Exemplary low Tg heteroalkyl acrylates include, but are not limited to, 2-methoxyethyl acrylate and 2-ethoxyethyl acrylate.

In some embodiments, the low Tg alkyl methacrylates include an alkyl group with greater than 4, 5, 6, 7 or 8 carbon atoms. Exemplary alkyl (meth)acrylates include, but are not limited to, 2-ethylhexyl (meth)acrylate, isooctyl (meth)acrylate, n-octyl (meth)acrylate, isodecyl (meth)acrylate, and lauryl (meth)acrylate.

In some embodiments, the monomer is an ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol.

In some embodiments, the (meth)acrylic copolymer may further comprise a high Tg alkyl (meth)acrylate monomer, having a Tg of at least 0° C., 25° C., or 50° C. Suitable high Tg monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, and propyl methacrylate or combinations.

The Tg of the copolymer may be estimated by use of the Fox equation, based on the Tgs of the homopolymer of constituent monomers and the weight percent thereof.

In some embodiments, the (meth)acrylic copolymer comprises at least 50, 55, 60, 65, 70, 75, 80, 85, 90 or 95 wt.-% (meth)acrylate ester monomers having a Tg less than 0° C., −10° C., −20° C., −30° C. or −40° C. based on the total weight of the (meth)acrylic copolymer. When high Tg monomers are included, the (meth)acrylic polymer may include at least 1, 2, 3, 4, 5, 10, 15, 20, ranging up to 30 wt.-% of such high Tg monomer(s).

Due to the relatively high concentration of polymerized units of low Tg monomer(s), the (meth)acrylic polymer and pressure sensitive adhesive composition also has a Tg less than 0° C. and more typically less than −10° C., −20° C., −30° C. or −40° C. The Tg of the (meth)acrylic polymer is typically at least about −80° C., −70° C., −60° C., or −50° C.

The (meth)acrylic copolymer comprises polymerized units of one or more ethylenically unsaturated monomers comprising a pendent functional group that forms an ionic or covalent bond with an amine or carboxylic acid group of the amino acid crosslinker. In some embodiments, the pendent functional group is a carboxylic acid, amine, or amide. In this embodiment, such ethylenically unsaturated monomers are a subset of polar monomers.

In some embodiments, the (meth)acrylic copolymer comprises polymerized units derived from an acid-functional ethylenically unsaturated monomer, where the acid-functional group may be an acid per se, such as a carboxylic acid, or a portion may be a salt thereof, such as an alkali metal carboxylate. Useful acid-functional ethylenically unsaturated monomers include, but are not limited to, those selected from an ethylenically unsaturated carboxylic acids, ethylenically unsaturated sulfonic acids, ethylenically unsaturated phosphonic acids, and mixtures thereof. Such acid groups can react with the amine group of the amino acid crosslinker. Examples of such compounds include those selected from acrylic acid (AA), methacrylic acid, itaconic acid, fumaric acid, crotonic acid, citraconic acid, maleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Acid-functional ethylenically unsaturated monomers are typically selected from ethylenically unsaturated carboxylic acids, i.e., (meth)acrylic acids. When an even stronger acid is desired, an acid-functional ethylenically unsaturated monomer includes an ethylenically unsaturated sulfonic acid, an ethylenically unsaturated phosphonic acid, or a mixture thereof.

In some embodiments, the (meth)acrylic copolymer comprises polymerized units of acid-functional ethylenically unsaturated monomer in an amount of at least 0.5, 1, 2 or 3 wt.-%, based on the total weight of the (meth)acrylic copolymer. The polymerized units of acid-functional ethylenically unsaturated monomer can be present in an amount up to about 5, 6, 7, 8, 9, 10, 11, 12, 13, 14, or 15 wt.-%. However, when the (meth)acrylic copolymer comprises polymerized units comprising pendent amine or amide groups, the (meth)acrylic copolymer may comprise less than 0.5 wt.-%, less than 0.1 wt.-% or zero polymerized units of acid-functional ethylenically unsaturated monomer.

One exemplary (meth)acrylic copolymer comprising carboxylic acid functionality is derived from copolymerizing isooctyl acrylate (IOA) and acrylic acid (AA).

The adhesive copolymer may further comprise polymerized units of one or more polar non-acid-functional monomers. The polar monomers useful in preparing the copolymer are both somewhat oil soluble and water soluble, resulting in a distribution of the polar monomer between the aqueous and oil phases in an emulsion polymerization.

Representative examples of suitable non-acid functional polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof.

Some of such non-acid functional polar monomers provide pendent amine or amide groups to the (meth)acrylic polymer. Such amine or amide groups react with the carboxylic acid group of the amino acid crosslinker. Representative monomers include acrylamide; mono- or di-N-alkyl substituted acrylamide; t-butyl acrylamide; dimethylaminoethyl acrylamide; and N-octyl acrylamide.

The non-acid functional polar monomer(s) that provide pendent amine or amide groups may be present in an amount of at least 0.5, 1, 2 or 3 wt.-%, based on the total weight of the (meth)acrylic copolymer. Such polymerized units of polar monomer can be present in an amount up to about 5, 6, 7, 8, 9, 10, 11, 12, 13, 14, or 15 wt.-%. However, when the (meth)acrylic copolymer comprises polymerized units comprising polymerized units of acid-functional ethylenically unsaturated monomer, the (meth)acrylic copolymer may comprise less than 0.5-wt. %, less than 0.1 wt.-% or zero of polar monomer(s) that provide pendent amine or amide groups. The (meth)acrylic polymer may optionally comprise other non-acid functional polar monomer(s) that lack pendent amine or amide groups.

The (meth)acrylic copolymer may optionally comprise polymerized units of one or more vinyl monomers such as vinyl esters (e.g., vinyl acetate and vinyl propionate), styrene, substituted styrene (e.g., .alpha.-methyl styrene), vinyl halide, and mixtures thereof. The (meth)acrylic copolymer may comprise at least 1, 2, 3, 4, or 5 wt-% up to 10 or 15 wt.-% of polymerized units of vinyl monomers. In some embodiments, the (meth)acrylic copolymer comprises less than 0.5-wt. %, less than 0.1 wt.-% or zero of vinyl monomer(s).

The aqueous pressure sensitive adhesive composition further comprises at least one amino acid crosslinker. The amino acid is preferably miscible with an aqueous phase (meth)acrylic polymer such that the amino acid disperses without gelling or forming aggregates.

Various amino acids are known. Amino acids comprise a carboxylic acid group, an amine group, and a side chain. Amino acids most commonly have the general structure:

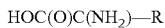

wherein R is an organic side chain.

In some embodiments, the amino acid crosslinker comprises a hydrophobic side chain such as in the case of alanine, isoleucine, leucine, methionine, phenylalanine, tryptophan, tyrosine, and valine.

In other embodiments, the amino acid crosslinker comprises a cyclic group such as in the case or proline, tyrosine, tryptophan, and especially histidine and phenylalanine and depicted as follows:

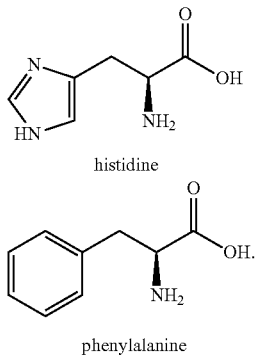

histidine phenylalanine

In some embodiments, the cyclic group is aromatic or in other words the side chain of the amino acid comprises an aromatic group (e.g. phenyl). In other embodiments, the side chain of the amino acid comprises a heterocyclic group, typically including one or two nitrogen atoms such as in the case of histidine.

In another embodiment, the amino acid comprises an electrically charged side chain (i.e. electrically charged at a pH of 7.4). For example, lysine, histidine and arginine have a side chain that comprise a positively charge (nitrogen-containing) group. Aspartic acid and glutamic acid have a side chain that comprises a negatively charged (oxygen-containing) group.

In yet other embodiments, the side chain of the amino acid comprises a group that is suitable to function as a chain transfer agent during the polymerization of (meth)acrylic polymer. In this embodiment, the amino acid comprises a chain transfer group such as SH, SeH, or OH such as in the case of serine, threonine, tyrosine, and cysteine depicted as follows.

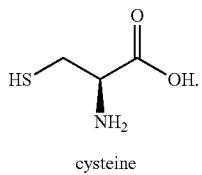

cysteine

Combinations of two or more amino acid crosslinkers can be utilized.

The concentration of amino acid crosslinker can vary. In typical embodiments, the concentration of amino acid crosslinker is at least 0.005, 0.01, or 0.015, or 0.02 wt.-% solids of the (meth)acrylic polymer or total adhesive composition (such as when tackifier is present). In some embodiments, the concentration of amino acid crosslinker is at least 0.1, 0.2, 0.3, 0.4, or 0.5 wt.-% solids of the (meth)acrylic polymer or total adhesive composition. In other embodiments, the concentration of amino acid crosslinker is at least 0.6, 0.7, 0.8, 0.9, or 1.5 wt.-% solids of the (meth)acrylic polymer or total adhesive composition. In typical embodiment, the concentration of amino acid crosslinker is no greater than 10, 9, 8, 7, 6, 5, 4, or 3 wt.-% solids of the (meth)acrylic polymer or total adhesive composition.

The pressure sensitive adhesive composition may optionally comprise additional crosslinkers such as multifunctional (meth)acrylates, aziridine crosslinkers, and (e.g. chlorinated triazine crosslinkers. However, in typical embodiments, the amino acid is the sole or primary crosslinker. Thus, the pressure sensitive adhesive composition can comprise little or no of such additional crosslinkers.

The (meth) acrylic polymer of the pressure sensitive adhesive can be prepared by conventional free radical polymerization method, including water-based dispersion, emulsion, and suspension processes. The (meth)acrylate polymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado).

Water-soluble and oil-soluble thermal initiators useful in preparing the (meth)acrylate adhesive polymers used in the present invention are initiators that, on exposure to heat, generate free-radicals which initiate (co)polymerization of the monomer mixture. Water-soluble initiators are preferred for preparing the (meth)acrylate polymers by emulsion polymerization.

Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)), VAZO™ 67 (2,2'azobis (2-methylbutyronitrile)), and VAZO™ 52 (2,2'-azobis(2,4-dimethylpentanenitrile)), available from E.I. du Pont de Nemours Co., peroxides such as benzoyl peroxide and lauroyl peroxide, and mixtures thereof. The preferred oil-soluble thermal initiator is 2,2'-azobis(2,4-dimethylpentanenitrile). When used, initiators are typically present in amount of at least about 0.05, 0.1, or 0.5 up to about 1 part by weight based on the total monomers of the (meth)acrylic polymer.

The copolymerizable emulsion mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The emulsion mixture may further comprise a chain transfer agent in an amount of at least 0.01, 0.02, 0.03, 0.04. or 0.05 up to 0.2, 0.3, 0.4, or 0.5 parts by weight based on the total monomer of the (meth)acrylic polymer Preferably, an emulsion polymerization method is used to prepare the adhesive copolymer. Polymerization via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, zwitterionic surfactants, and mixtures of surfactants.

The emulsion polymerization is typically carried out in the presence of anionic surfactant(s). A useful range of emulsifier concentration is from about 0.5 to about 8 weight percent, preferably from about 1 to about 5 weight percent, based on the total weight of all monomers of the emulsion pressure sensitive adhesive.

In emulsion polymerization a reaction occurs in micelles or emulsion microdrops suspended in aqueous medium. Any heat generated in the microdrops or micelles is quickly moderated by the effect of the heat capacity of the surrounding water phase. Emulsion polymerization proceeds with better control of exothermic reactions, and the resulting adhesive composition is non-flammable as the aqueous medium is the dominant component.

The (meth)acrylate copolymers may be prepared by a batch, continuous or semicontinuous emulsion polymerization process. The polymerization generally comprises the steps of:
(a) making a monomer mixture comprising
  (i) a sufficient amount of low Tg (meth)acrylic ester monomer(s),
  (ii) monomer(s) comprising a functional group that is reactive with a carboxylic acid or amine group;
  (iii) optional monomers,
  (iv) optional (e.g. oil-soluble) chain transfer agent,
(b) combining the monomer mixture with an aqueous phase comprising
  (i) water,
  (ii) surfactant(s),
  (iii) free radical initiator(s),
  (iv) optional (e.g. water soluble) chain transfer agent,
(c) concurrently agitating and heating said emulsion to a temperature of about 30° C. to about 80° C. to polymerize the monomers in the oil-in-water emulsion until a polymeric latex is formed. It will be understood that once the emulsion mixture is prepared, the monomers may partition between the oil phase and the water phase, according to their respective partition coefficients.

In an alternative embodiment, the monomer(s) comprising the functional group that is reactive with a carboxylic acid or amine group may be present in the aqueous phase, rather than the monomer mixture.

In the semicontinuous process, a flask is charged with a seed monomer mixture comprising deionized (DI) water, surfactant, acid functional monomers, (meth)acrylate ester monomers, optional co-polymerizable monomers, including optional polar monomers, vinyl monomer, and any optional chain transfer agents, pH modifiers or other additives. The mixture is stirred and heated under an inert atmosphere such as a nitrogen blanket. When the mixture has reached induction temperature, typically about 50° to about 70° C., the first initiator is added to initiate the polymerization and the reaction is allowed to exotherm. After the seed reaction is completed, the batch temperature is then raised to the feed reaction temperature, about 70° to about 85° C. At the feed reaction temperature, the monomer pre-emulsion comprising deionized water, surfactant acid functional monomers, (meth)acrylate ester monomers, optional co-polymerizable monomers, including optional polar monomers, chain transfer agents or other additives is added to the stirred flask over a period of time, typically 2 to 4 hours, while the temperature is maintained. At end of the feed reaction, the second initiator charge, if used, is added to the reaction to further reduce residual monomers in the emulsion. After an additional hour of heating, the mixture is cooled to room temperature (about 23° C.) and the emulsion is collected for evaluation.

A neutralizing agent may be employed in the preparation of this copolymer. It may be employed at a level sufficient to neutralize all or a part of the acid groups of the polymer. Neutralization is achieved via the use of an alkali metal hydroxide or a combination of an alkali metal hydroxide with a minor amount of another neutralizing agent. A wide variety of other neutralizing agents may be used as will be understood by those skilled in the art. The selection of the other neutralizing agent, and the amount employed may be varied to achieve a desired result. However, the type and amount is selected such that the (meth)acrylic polymer remains water dispersible. Preferably ammonium, sodium and potassium hydroxide are used as neutralizing agents.

The pH of the emulsion may be 4 or greater. The acidity of the emulsion may be modified following latex formation using a pH modifier such as a basic solution (e.g., solutions of sodium hydroxide, ammonium hydroxide, lithium hydroxide and the like) or buffer solutions (e.g., sodium bicarbonate and the like), to the desired pH levels.

In typical embodiments, the amino acid is added after the (meth)acrylic polymer is formed and prior to removing the aqueous phase. However, when the amino acid comprises a side chain having a chain transfer group the amino acid can be added to the monomer mixture or aqueous phase during the polymerization of the (meth)acrylic copolymer. In this embodiment, the amino acid can function as a chain transfer agent during the polymerization of the monomers and also function as a crosslinker for the (meth)acrylic polymer. When the amino acid is utilized as a chain transfer agent during polymerization, the concentration of amino acid is less than 0.1 wt.-% and in some embodiments no greater than 0.075 or 0.005 wt.-%. However, additional amino acid can be added after polymerization if desired.

The pressure sensitive adhesive may contain one or more conventional additives. Preferred additives include tackifiers, plasticizers, dyes, antioxidants, and UV stabilizers.

Suitable tackifiers for use with (meth)acrylate polymer dispersions include rosin acids, rosin esters, terpene phenolic resins, hydrocarbon resins, and coumarone indene resins. The type and amount of tackifier can affect properties such as contactability, bonding range, bond strength, heat resistance and specific adhesion. The tackifier will generally be used in the form of an aqueous dispersion. Commercially available tackifiers that are suitable include TACOLYN™ 1070, 5001 and 5002 (aqueous, 55% solids synthetic resin dispersions based on low molecular weight thermoplastic resins, available from Hercules Inc.), SE1055™ (an aqueous dispersion of a rosin ester, available from Hercules Inc.), ESCOREZ™ 9271 (an aliphatic hydrocarbon resin emulsion, available from Exxon), DERMULSENE™ 82, DERMULSENE™ 92, DERMULSENE™ DT or DERMULSENE™ DT50 (aqueous dispersions of modified terpene phenolic resins, available from DRT) and AQUATAK™ 4188 (a modified rosin ester, available from Arizona Chemical Company). When present, the amount of tackifying resin is typically at least 1, 2, 3, 4, or 5 wt-% of the pressure sensitive adhesive and no greater than about 50 or 40 wt-% of the pressure sensitive adhesive. In some embodiments, the amount of tackifying resin is at least 10, 15 or 20 wt-% of the pressure sensitive adhesive. In other embodiments, the amount of tackifying resin is less than 1 wt.-% or 0.5 wt.-% or zero.

The (meth)acrylic copolymer typically has a storage modulus (G') at 25° C. and a frequency of 1 Hertz (radian/ second) of at least $1 \times 10^4$ dynes/cm$^2$ and no greater than $1 \times 10^7$ dynes/cm$^2$ (1 MPa) or $5 \times 10^6$ dynes/cm$^2$ (0.5 MPa) or $3 \times 10^6$ dynes/cm$^2$ (0.3 MPa) as determined by Dynamic Mechanical Analysis. For example, the storage modulus of a (meth)acrylic copolymer prepared from 90 parts isooctyl acrylate, 10 parts acrylic acid is about $1.5 \times 10^6$ dynes/cm$^2$ (prior to crosslinking with the amino acid). In yet another example, a (meth)acrylic copolymer prepared from 98 parts isooctyl acrylate and 2 parts acrylic acid is about $2 \times 10^5$ dynes/cm$^2$ (prior to crosslinking with the amino acid). When the (meth)acrylic polymer alone is not a PSA, the composition can further comprise a component such as tackifying resin to reduce the storage modulus. Although the crosslinking raises the storage modulus, the crosslinked pressure sensitive adhesive falls within the storage modulus range of a PSA (e.g. no greater than $3 \times 10^6$ dynes/cm$^2$ (0.3 MPa).

In some embodiments, the (dried and crosslinked) pressure sensitive adhesive exhibits a 180° peel adhesion to stainless steel of at least 0.25, 0.5, 1 or 1.5 N/cm. In some embodiments, the 180° peel adhesion to stainless steel does not exceed 5 N/cm. The shear adhesion strength can vary depending on the (meth)acrylic polymer and concentration of crosslinker. In some embodiments, the shear adhesion strength to stainless steel and or fiberboard exceeds 10,000 minutes. In some embodiments, the pressure sensitive adhesive exhibits high tack at cold temperatures (e.g. 40° F.). In some embodiment, the pressure sensitive adhesive exhibits a shear strength after aging for 10 days at 120° F. of greater than or equal to the initial shear strength. In some embodiments, the (initial or aged at 120° F. for 10 or 11 days) shear strength to fiberboard is at least 25, 50, 100, 150, 200, 250, 300, 350, 400, 450, 500, 550, 600, 650, or 700 minutes. Such adhesive properties can be determined according to the test methods described in the forthcoming examples The aqueous emulsions are of a suitable concentration for subsequent coating. In typical embodiments, the aqueous pressure sensitive adhesive composition comprises 30 to 70 wt.-% total solids. Thus the aqueous pressure sensitive adhesive composition contains 30 to 70 wt-% of an aqueous phase. The desired concentration may be achieved by further dilution of the coating composition, or by partial drying.

The aqueous phase may contain a small amount of volatile, non-polymerizable organic solvent that may be included in the aqueous adhesive composition to dissolve components, such as the amino acid crosslinker. The aqueous adhesive composition typically contains less than 10, 5, 4, 3, 2, or 1 weight percent of organic solvent.

The above-described aqueous pressure sensitive adhesive compositions are coated on a substrate, such as a release liner or (e.g. flexible or inflexible) backing material by conventional coating techniques. The backing material may be surface treated or comprise a primer layer as known in the art (See for example WO2014/127341).

The compositions can be applied to a variety of substrates by methods such as roller coating, flow coating, dip coating, spin coating, spray coating knife coating, and die coating. Upon drying, the amino acid crosslinks with the functional groups of the (meth)acrylic polymer to produce adhesive coated articles such as sheet materials.

The thickness of the (dried) PSA layer is typically at least about 10, 15, 20, or 25 micrometers and no greater than 1500 micrometers (60 mil), 1000 micrometers (40 mils), or 500 micrometers (20 mils). Multiple coatings can be utilized to increase the thickness as desired.

The flexible backing material may be any material conventionally utilized as a tape backing, optical film or any other flexible material.

Examples of materials that can be included in the flexible support include polyolefins such as polyethylene, polypropylene (including isotactic polypropylene), polystyrene, polyester, polyvinyl alcohol, poly(ethylene terephthalate), poly(butylene terephthalate), polyimide, poly(caprolactam), poly(vinylidene fluoride), polylactides, cellulose acetate, and ethyl cellulose and the like.

Commercially available backing materials include for example HOSTAPHAN 3SAB, primed polyester film (available from Mitsubishi Polyester Film Inc., Greer, S.C.), Kraft paper (available from Monadnock Paper, Inc.); cellophane (available from Flexel Corp.); spun-bond poly(ethylene) and poly(propylene), such as TYVEK and TYPAR (available from DuPont, Inc.); and porous films obtained from poly (ethylene) and poly(propylene), such as TESLIN (available from PPG Industries, Inc.), and CELLGUARD (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials and may take the form of any article conventionally known to be utilized with pressure sensitive adhesive compositions such as labels, tapes, signs, covers, marking indicia, and the like.

The flexible support may also comprise a release-coated substrate. Such substrates are typically employed when an adhesive transfer tape is provided. Examples of release-coated substrates are well known in the art and include, by way of example, silicone-coated kraft paper and the like. Tapes of the invention may also incorporate a low adhesion backsize (LAB) which are known in the art.

Objects and advantages of this disclosure are further illustrated by the following examples, but the particular materials and amounts thereof recited in these examples, as well as other conditions and details, should not be construed to unduly limit this disclosure.

Materials

| Material | Description |
|---|---|
| IOA | Isooctyl acrylate. |
| AA | Acrylic Acid, 99% purity, obtained from Alfa Aesar, Ward Hill, MA. |
| DS-10 | Sodium dodecylbenzene sulfonate, available under the trade designation RHODACAL DS-10, from Rhodia Incorporated, Cranbury, NJ. |

| Material | Description |
| --- | --- |
| CBr4 | Carbon tetrabromide, 98% purity, obtained from Alfa Aesar,Ward Hill, MA. |
| L-Cys | L-Cysteine, melting point: 224-226° C., obtained from MP Biomedicals Incorporated, Eschwege, Germany. |
| FS solution | 0.22 grams ferrous sulfate, Fe2SO4•7H2O, 99% purity in 100 grams deionized water, from J. T. Baker Chemicals, Phillipsburg, NJ,. |
| SMBS | Sodium metabisulfite, Na2S2O5 97% purity, obtained from Alfa Aesar, Ward Hill, MA. |
| KPS | Potassium persulfate, K2S2O8, obtained from Alfa Aesar, Ward Hill, MA. |
| LiOH | Lithium Hydroxide, 98% purity, obtained from Alfa Aesar, Ward Hill, MA. |
| L-Phenyl | L-Phenylalanine, 99% purity, obtained from Alfa Aesar Avocado Organics, Heysham, Lancashire, UK. |
| L-Hist | L-Histidine, USP grade, obtained from aMReSCO, Solon, OH. |
| Base Emulsion Polymer 1 | A milky white, water-based acrylic emulsion pressure sensitive adhesive, 53-57% solids, available under trade designation FASTBOND Insulation Adhesive 49 from 3M Company, St. Paul, MN. |
| Base Emulsion Polymer 2 | A milky white, anionic emulsion, 53% solids, of a permanent acrylic pressure sensitive adhesive, available under the trade designation ROBOND PS-90 from Dow Chemical Company, Midland, MI. |
| Primed Polyester Film | A 25 micrometer (0.001 inch) thick corona treated polyester film was provided with a primer coating as described in the publication JP H02200476A. |

Tests Methods

Peel Adhesion

Peel adhesion was measured at an angle of 180 degrees as follows. Sample conditioning and testing were conducted at 23° C. (73° F.) and 50% relative humidity (RH). After conditioning for 24 hours a tape sample measuring 12.7-millimeters (0.50 inches) wide and at least 10.2 centimeters (4 inches) long was cut. A stainless steel plate was attached around its borders to the platen of a peel tester using single coated PSA tape and wiped twice with isopropanol. Next, the tape sample was applied to the stainless steel plate and rolled down twice in each direction using a 2 kilogram (4.4 pound) rubber roller. The sample was peeled from the stainless steel plate at a platen speed of 305 millimeters/minute (12 inches/minute) over a length of 2.54 centimeters (1 inch) using an IMASS Slip/Peel Tester (Model SP-2000, available from IMASS Incorporated, Accord, Mass.). Peel adhesion data was collected over the last 2.0 cm (0.8 inches). Four samples were evaluated, the results normalized to ounces/inch (oz/in.), and the average reported.

Shear Strength at Room Temperature—Stainless Steel

Shear strength on stainless steel was measured as follows. Conditioning and testing were done at 23° C. (73° F.) and 50% relative humidity (RH). After conditioning for 24 hours a tape sample measuring 12.7 millimeters (0.50 inches) wide and 11.4 centimeters (4.5 inches) long was cut. A stainless steel plate was wiped twice with isopropanol. The tape sample was then centered on cleaned stainless steel panel and adhered to one end such that tape overlapped the panel by 12.2 millimeters (0.5 inches) in the lengthwise direction and rolled down twice in each direction using a 2 kilogram (4.4 pound) rubber roller. A 1.0 kilogram (2.2 pound) weight was then attached to the free end of the tape, and the panel/tape/weight assembly was suspended in a stand at an angle of 2° from vertical. The time, in minutes, for the tape to fall from the panel was recorded. The test was terminated if failure had not occurred in 10,000 minutes and the result recorded as "10000". The average of three samples was reported.

Shear Strength at Room Temperature—Fiberboard

Shear strength of a tape sample on a 127 micrometer (0.005 inches) thick fiberboard was measured in the same manner as described in "Shear Strength at Room Temperature—Stainless Steel" with the following modification. A piece of fiberboard measuring 2.54 cm (1 inch) square was attached to the stainless steel plate using double coated adhesive tape. The tape sample was then adhered to the exposed fiberboard surface.

Preparation of Comparative Composition Example 1 (CE 1)

Comparative Composition Example 1, comprising an emulsion polymer EP 1 containing CBr4 chain transfer agent (CTA), was made using conventional emulsion polymerization techniques. The monomer formulation was IOA:AA/ 95:5 (w:w). An aqueous solution was prepared by adding 3.8 grams DS-10 surfactant to 224.7 grams of deionized water in a 1 liter reaction flask equipped with stirrer, reflux condenser, thermometer, infrared heat lamps connected to a temperature controller, and nitrogen purge. The mixture was stirred at room temperature until all solids were dissolved. Then, 9.5 grams AA was added in a single charge to the aqueous solution. Next, an oil solution was prepared by adding and dissolving 0.177 grams of CBr4 chain transfer agent in 180 grams of IOA. The oil solution was then added in a single charge to the reaction flask while stirring to create an emulsion. Then a nitrogen purge above the reaction mixture was started at 2 liters/minute for 30 minutes. Next, the reaction flask was heated to 30° C. using controlled heat lamps followed by addition of 0.5 milliliters of FS solution then 0.095 grams SMBS and 0.38 grams KPS to initiate the reaction. The temperature was observed to increase to about 60° C. due to the polymerization exotherm. The reaction was held at this temperature for one hour, then allowed to cool to room temperature, followed by addition of 1.32 grams of LiOH dissolved in 16.43 grams of deionized water. After filtering through cheese cloth an emulsion polymer composition having a solids content of about 44% was obtained Preparation of Composition Examples 1-2

Composition Examples 1-2, comprising emulsion polymers EP 2-EP 3, containing the amino acid L-Cys in various amounts as a CTA and crosslinker, were prepared in a manner similar to that described for Comparative Composition Example 1 with the following modifications. The CBr4 was replaced with various amounts of L-Cys and the L-Cys was added along with the AA to the aqueous phase. The mol % with respect to (w/r/t) monomer was calculated by taking the ratio of amount of CTA in moles to total amount of monomers in moles (0.05 moles of CTA per 100 moles of monomers). Wt % with respect to (w/r/t) monomer is calculated in a similar way but using weight of the CTA and monomers (0.03 g of CTA per 100 g of monomers).

TABLE 1

| | Composition | | | | |
|---|---|---|---|---|---|
| Composition Example | Emulsion Polymer | CTA | CTA amount (grams) | CTA amount (mol % w/r/t monomer) | CTA amount (wt % w/r/t monomer) |
| CE 1 | EP 1 | CBr4 | 0.177 | 0.05 | 0.09 |
| 1 | EP 2 | L-Cys | 0.033 | 0.02 | 0.02 |
| 2 | EP 3 | L-Cys | 0.066 | 0.05 | 0.03 |

Preparation of Comparative Tape Example 1 and Tape Examples 1-2

Comparative Composition Example 1 and Composition Examples 1-2 were coated onto a primed polyester film then dried in an oven at 100° C. for five minutes to provide tape samples having final adhesive thicknesses and properties as shown in Table 2.

TABLE 2

| | Composition | | | Dry Adhesive | | | 180° Peel Adhesion |
|---|---|---|---|---|---|---|---|
| Tape Ex. | Emulsion Polymer | CTA | CTA amount (wt % w/r/t monomer) | Thickness micrometers (inches) | Shear (minutes) SS | FB | SS oz/in (N/cm) |
| CE 1 | EP 1 | CBr4 | 0.09 | 27.9 (0.011) | 548 | 66 | 19.6 (2.15) |
| 1 | EP 2 | L-Cys | 0.02 | 30.5 (0.0012) | 2439 | 1109 | 16.3 (1.78) |
| 2 | EP 3 | L-Cys | 0.03 | 27.9 (0.011) | 1747 | 819 | 15.4 (1.69) |

Preparation of Composition Examples 3-6

Composition Examples 3-6 were prepared by combining EP 1 and selected amounts of L-Hist crosslinker in a glass jar which was then sealed and placed on a roller for at least one hour.

Preparation of Comparative Composition Example 2 and Composition Examples 7-8

Base Emulsion Polymer 1 was provided along with modifications made by the addition of various amounts of L-Phenyl crosslinker. These were prepared by mixing as described for Composition Examples 3-6.

Preparation of Comparative Composition Example 3 and Composition Examples 9-10

Base Emulsion Polymer 2 was provided along with modifications made by the addition of either L-Hist or L-Phenyl crosslinker. These were prepared by mixing as described for Composition Examples 3-6.

Preparation of Comparative Tape Examples 2 and 3, and Examples 3-10

Comparative Composition Examples 2 and 3, and Composition Examples 3-10, were used to prepare tape samples as described for Comparative Tape Example 1 and Tape Examples 1-2 above. Tape Example 6 was prepared the same way as Tape Example 5 with the following modification. The composition was kept at room temperature for 16 days then used to prepare tape samples without any further mixing. Adhesive compositions, thicknesses, and tape properties are shown in Tables 3 and 4 below. The wt. % of the amino acids was calculated by taking the ratio of amount of amino acids in weight to the total weight of aqueous emulsion polymer, including the weight of the water. The wt.-% solids can be determined by adjusting the weight to account for the removal of the aqueous phase by drying. For example, when the aqueous pressure sensitive adhesive contains 50 wt.-% aqueous phase, the concentration of amino acid as percentage of solids doubles upon removal of the aqueous phase. (1 wt.-% solution=2 wt.-% solids)

TABLE 3

| | | Composition | | | | | |
|---|---|---|---|---|---|---|---|
| | | Emulsion | Crosslinker | | Emulsion | Crosslinker | |
| Composition Example | Emulsion Polymer | Polymer (grams) | L-Phenyl (grams) | L-Hist (grams) | Polymer (wt %) | L-Phenyl (wt %) | L-Hist (wt %) |
| CE 1 | EP 1 | N/A | 0 | 0 | 100 | 0 | 0 |
| 3 | EP 1 | 20.2 | 0 | 0.074 | 99.63 | 0 | 0.37 |

TABLE 3-continued

| | | Composition | | | | | |
|---|---|---|---|---|---|---|---|
| | | Emulsion | Crosslinker | | Emulsion | Crosslinker | |
| Composition Example | Emulsion Polymer | Polymer (grams) | L-Phenyl (grams) | L-Hist (grams) | Polymer (wt %) | L-Phenyl (wt %) | L-Hist (wt %) |
| 4 | EP 1 | 40.0 | 0 | 0.436 | 98.91 | 0 | 1.09 |
| 5 | EP 1 | 59.9 | 0 | 0.668 | 98.88 | 0 | 1.12 |
| 6 | EP 1 | 59.9 | 0 | 0.668 | 98.88 | 0 | 1.12 |
| CE 2 | BP 1 | N/A | 0 | 0 | 100 | 0 | 0 |
| 7 | BP 1 | 10 | 0.041 | 0 | 99.59 | 0.41 | 0 |
| 8 | BP 1 | 10 | 0.132 | 0 | 98.68 | 1.32 | 0 |
| CE 3 | BP 2 | N/A | 0 | 0 | 100 | 0 | 0 |
| 9 | BP 2 | 10 | 0.132 | 0 | 98.68 | 1.32 | 0 |
| 10 | BP 2 | 10 | 0 | 0.124 | 98.76 | 0 | 1.24 |

TABLE 4

| Tape Example | Emulsion Polymer | Crosslinker | | Dry Adhesive Thickness, micrometers (inches) | Shear | | 180° Peel Adhesion SS oz/in (N/cm) |
|---|---|---|---|---|---|---|---|
| | | L-Phenyl (wt %) | L-Hist (wt %) | | SS (minutes) | FB (minutes) | |
| CE 1 | EP 1 | 0 | 0 | 27.9 (0.0011) | 548 | 66 | 19.6 (2.15) |
| 3 | EP 1 | 0 | 0.37 | 33.0 (0.0013) | 946 | | 19.0 (2.08) |
| 4 | EP 1 | 0 | 1.09 | 27.9 (0.0011) | 10,000+ | 10,000+ | 16.7 (1.83) |
| 5 | EP 1 | 0 | 1.12 | 27.9 (0.0011) | 10,000+ | | 14.9 (1.63) |
| 6 | EP 1 | 0 | 1.12 | 30.5 (0.0012) | 10,000+ | 10,000+ | 17.3 (1.89) |
| CE 2 | BP 1 | 0 | 0 | 27.9 (0.0011) | 880 | | 22.1 (2.42) |
| 7 | BP 1 | 0.41 | 0 | 30.5 (0.0012) | 8,015 | | 24.8 (2.71) |
| 8 | BP 1 | 1.32 | 0 | 30.5 (0.0012) | 10,000+ | | 27.7 (3.03) |
| CE 3 | BP 2 | 0 | 0 | 35.6 (0.0014) | 77 | | 27.4 (3.00) |
| 9 | BP 2 | 1.32 | 0 | 33.0 (0.0013) | 428 | | 29.0 (3.17) |
| 10 | BP 2 | 0 | 1.24 | 33.0 (0.0013) | 2756 | | 18.8 (2.06) |

Preparation of Composition Examples 11-13

In a glass jar, the emulsion polymer 2 (EP-2) was combined with L-Lysine amino acid, obtained from Sigma at the quantities described in the following table. The glass jar was then rolled on a jar roller for two hours to ensure thorough mixing. Solutions were coated on primed BOPP (1.6 mil) and then dried in an oven at 70° C. for 7.5 minutes to generate adhesive-coated tape with an adhesive thickness of 1 mil.

The shear strength at room temperature to fiberboard was tested in the same manner a previously described except that 4 passes of the roller was used to adhere the tape to the fiberboard. The shear strength at room temperature to fiberboard was retested after aging at 120° F. for 11 days.

| Ex. | Emulsion Adhesive (g) | Lysine (g) | Shear on FB (min) | Shear on FB (min) after aging (11 days at 120° F.) |
|---|---|---|---|---|
| CE4 | N/A | 0 | 19 | 20 |
| 11 | 30.1 | 0.242 | 43 | 14 |
| 12 | 30.0 | 0.342 | 157 | 198 |
| 13 | 30.1 | 0.435 | 698 | 304 |

What is claimed is:

1. A pressure sensitive adhesive composition comprising:
an aqueous phase;
a surfactant;
a (meth)acrylic polymer comprising polymerized units of (meth)acrylic ester monomer having a Tg less than 0°

C. and ethylenically unsaturated monomer comprising a pendent functional group wherein the pendent functional group forms an ionic or covalent bond with an amine or carboxylic acid group; and an at least one amino acid crosslinker having the structure

HOC(O)C(NH$_2$)—R wherein R is an organic side chain lacking a chain transfer group selected from SH, SeH, or OH.

2. The pressure sensitive adhesive composition of claim 1 wherein R comprises a hydrophobic group or a cyclic group.

3. The pressure sensitive adhesive composition of claim 2 wherein the cyclic group is aromatic.

4. The pressure sensitive adhesive composition of claim 3 wherein the amino acid crosslinker is selected from histidine and phenylalanine.

5. The pressure sensitive adhesive composition of claim 1 wherein R is electrically charged.

6. The pressure sensitive adhesive composition of claim 5 wherein the amino acid crosslinker is selected from lysine and histadine.

7. The pressure sensitive adhesive composition of claim 1 wherein R is not suitable to function as a chain agent during the polymerization of (meth)acrylic polymer.

8. The pressure sensitive adhesive composition of claim 1 wherein the pressure sensitive adhesive has a 180° peel adhesion to stainless steel of at least 0.25, 0.5, 1 or 1.5 N/cm wherein the peel adhesion is tested at 23° C. and 50% relative humidity by:
cutting a tape sample measuring 12.7 millimeters (0.50 inches) wide and 10.2 centimeters (4 inches) long,
wiping a stainless steel plate twice with isopropanol,
rolling down the tape twice in each direction using a 2 kilogram (4.4 pound) rubber roller, from the stainless steel plate at a platen speed of 305 millimeters/minute (12 inches/minute) over a length of 2.54 centimeters (1 inch).

9. The pressure sensitive adhesive composition of claim 1 wherein the (meth)acrylic polymer comprises at least 50 wt-% of polymerized units of (meth)acrylic ester monomer(s) having a Tg less than 0° C.

10. The pressure sensitive adhesive composition of claim 1 wherein the (meth)acrylic polymer comprises at least 50 wt-% of polymerized units of (meth)acrylic ester monomer(s) having an alkyl group with 6 to 20 carbon atoms.

11. The pressure sensitive adhesive composition of claim 1 wherein the composition further comprises tackifying resin.

12. The pressure sensitive adhesive composition of claim 1 wherein the pressure sensitive adhesive has a Tg no greater than −10° C.

13. The pressure sensitive adhesive composition of claim 1 wherein the pressure sensitive adhesive has a storage modulus of no greater than 0.3 MPa at 25° C. and 1 Hertz.

14. The pressure sensitive adhesive composition of claim 1 wherein the (meth)acrylic polymer comprises 1 to 15 wt-% of the polymerized units of the ethylenically unsaturated monomer comprising the pendent functional group.

15. The pressure sensitive adhesive composition of claim 1 wherein the pendent functional group is a carboxylic acid group, an amine group, an amide group, or a combination thereof.

16. A pressure sensitive adhesive composition comprising:
a (meth)acrylic polymer comprising polymerized units of (meth)acrylic ester monomer having a Tg less than 0° C. and ethylenically unsaturated monomer comprising a pendent functional group crosslinked with an amine or carboxylic acid group of at least one amino acid crosslinker having the structure

HOC(O)C(NH$_2$)—R wherein R is an organic side chain lacking a chain transfer group selected from SH, SeH, or OH.

17. An article comprising the composition of claim 16 disposed on a substrate.

18. The article of claim 16 wherein the substrate is a release liner or backing.

19. A method of making a pressure sensitive adhesive composition comprising:
a) providing an aqueous pressure sensitive adhesive composition comprising a (meth)acrylic polymer comprising polymerized units of (meth)acrylic ester monomer having a Tg less than 0° C. and ethylenically unsaturated monomers comprising a pendent functional group that forms an ionic or covalent bond with an amine or carboxylic acid group;
b) combining the aqueous pressure sensitive adhesive composition with an amino acid having the structure

HOC(O)C(NH$_2$)—R wherein R is an organic side chain lacking a chain transfer group selected from SH, SeH, or OH;
c) coating the aqueous pressure sensitive adhesive composition prepared in (b) onto a substrate;
e) drying the pressure sensitive adhesive composition and thereby crosslinking the pendent functional groups of the (meth)acrylic polymer with the amino acid.

20. A pressure sensitive adhesive comprising the dried and crosslinked composition of claim 1.

* * * * *